(12) United States Patent
Yamashita

(10) Patent No.: US 7,821,746 B2
(45) Date of Patent: Oct. 26, 2010

(54) MAGNETIC HEAD DEVICE INCLUDING HEAT-CONDUCTING LAYER FOR TRANSFERRING HEAT TO SLIDER BODY

(75) Inventor: Tomohiro Yamashita, Niigata-ken (JP)

(73) Assignee: TDK Corporation, Tokyo (JP)

( * ) Notice: Subject to any disclaimer, the term of this patent is extended or adjusted under 35 U.S.C. 154(b) by 710 days.

(21) Appl. No.: 11/890,080

(22) Filed: Aug. 3, 2007

(65) Prior Publication Data

US 2008/0285179 A1 Nov. 20, 2008

(30) Foreign Application Priority Data

Sep. 14, 2006 (JP) ............................ 2006-249215

(51) Int. Cl.
*G11B 5/127* (2006.01)
(52) U.S. Cl. ....................................................... 360/319
(58) Field of Classification Search ................. 360/319, 360/316, 317, 245.3, 236.5, 313, 125.12
See application file for complete search history.

(56) References Cited

U.S. PATENT DOCUMENTS

| | | | | |
|---|---|---|---|---|
| 7,652,855 B2 * | 1/2010 | Freitag et al. | ............... | 360/322 |
| 2002/0154453 A1 * | 10/2002 | Ikeda | ......................... | 360/322 |
| 2008/0055788 A1 * | 3/2008 | Nagai | ......................... | 360/323 |
| 2009/0086385 A1 * | 4/2009 | Gill et al. | ............... | 360/324.11 |

FOREIGN PATENT DOCUMENTS

| | | |
|---|---|---|
| JP | 2004-152393 | 5/2004 |
| JP | 2004-164813 | 6/2004 |

* cited by examiner

*Primary Examiner*—Allen T Cao
(74) *Attorney, Agent, or Firm*—Brinks Hofer Gilson & Lione

(57) ABSTRACT

A magnetic head device includes a TMR sensor or a CPP GMR sensor. Shield layers are disposed in contact with the top and bottom of a sensor body. A sensing current is supplied to the sensor body through the shield layers. Lead layers are connected to the shield layers and extend to below conductive pads. Ends of the lead layers are electrically connected to the conductive pads via lifting layers. Heat-conducting layers are disposed below the ends of the lead layers. An insulating layer is formed between the heat-conducting layers and an end surface of a slider body to such a thickness that it does not obstruct heat transfer. Heat applied from a molten solder to the lead layers is released to the slider body through the heat-conducting layers. This prevents the shield layers from being heated to high temperature.

8 Claims, 4 Drawing Sheets

MAGNETIC HEAD DEVICE INCLUDING HEAT-CONDUCTING LAYER FOR TRANSFERRING HEAT TO SLIDER BODY

CLAIM OF PRIORITY

This application claims benefit of the Japanese Patent Application No. 2006-249215 filed on Sep. 14, 2006, which is hereby incorporated by reference.

BACKGROUND

1. Field of the Disclosure

The present disclosure relates to magnetic head devices including magnetic sensors that are supplied with a sensing current from shield layers, including tunneling magnetoresistive (TMR) sensors and current-perpendicular-to-plane (CPP) giant magnetoresistive (GMR) sensors. In particular, the disclosure relates to a magnetic head device having soldered conductive pads electrically connected to shield layers.

2. Description of the Related Art

A magnetic head device for use in a hard disk drive, for example, has a magnetic sensor mounted on a slider and conductive pads arranged on an end surface of the slider. The magnetic sensor operates by a magnetoresistive effect. The slider is supported by a leaf spring called a flexure. The flexure, in turn, is mounted on a support member called a load beam. The slider is disposed opposite a surface of, for example, a hard disk and is supported so that the slider can be moved relatively freely as the flexure is deformed.

Conductive patterns are formed on surfaces of the load beam and the flexure with an insulating layer disposed therebetween. Electrodes are formed integrally with the conductive patterns on the surface of the flexure. The electrodes are disposed near the conductive pads arranged on the end surface of the slider.

With the slider fixed to the flexure by bonding, the conductive pads of the slider are connected to the electrodes of the flexure using a molten metal. A typical example of the molten metal used is a lead-free, tin-silver alloy solder. Examples of the related art are disclosed, for example, in Japanese Unexamined Patent Application Publication Nos. 2004-152393 and 2004-164813.

If the magnetic sensor is a TMR sensor, a magnetoresistive sensor utilizing a tunneling effect, or a CPP GMR sensor, a magnetoresistive sensor in which a sensing current flows perpendicularly, the magnetic sensor is disposed between a pair of shield layers with the top and bottom surfaces thereof in contact with the shield layers. The shield layers are connected to lead layers so that a sensing current flows perpendicularly from the conductive pads to the magnetic sensor via the lead layers and the shield layers.

When the conductive pads of the slider are bonded to the electrodes formed on the surface of the flexure using a molten metal, the conductive pads are heated to high temperature during the bonding and can instantaneously reach a temperature exceeding 300° C. The heat is then transferred from the lead layers to the shield layers, and accordingly the sides of the magnetic sensor are heated to high a temperature.

In addition, the areas of the shield layers in contact with the top and bottom surfaces of the magnetic sensor are larger than those of electrode layers in contact with the sides of a typical current-in-plane (CIP) GMR sensor. The heat is therefore readily transferred from the shield layers to the magnetic sensor. If the magnetic sensor reaches a high temperature exceeding, for example, 230° C., its pinned magnetic layer exhibits unstable magnetization, which can decrease magnetic sensitivity. Furthermore, the heat can cause variations in the magnetic domains of the shield layers. Such variations can result in generation of superimposed noise and unstable read output.

SUMMARY

The structure of the present disclosure provides a magnetic head device that can readily suppress the temperature rise of shield layers when a molten metal used to bond conductive pads applies heat to the conductive pads, thereby preventing a magnetic sensor, such as a TMR sensor or a CPP GMR sensor, bonded to the shield layers from being heated to high temperature.

A magnetic head device according to the present disclosure includes a slider body facing a magnetic recording medium, an insulating part disposed on an end surface of the slider body, a magnetic sensor disposed in the insulating part so as to face the magnetic recording medium, conductive pads disposed on a surface of the insulating part, and lead layers disposed in the insulating part so as to electrically connect the magnetic sensor to the conductive pads. The conductive pads are bonded with a molten metal to electrodes of a support supporting the slider body. The magnetic sensor includes a pinned magnetic layer whose magnetization direction is fixed, a free magnetic layer whose magnetization direction is changed by an external magnetic field, and a nonmagnetic layer disposed therebetween. The lead layers are electrically connected to a pair of shield layers between which the magnetic sensor is disposed so that a sensing current can be supplied to the magnetic sensor via the shield layers. The conductive pads are electrically connected to the lead layers in the insulating part by stacking the conductive pads on the lead layers directly or another conductive layer disposed therebetween. Heat-conducting layers are disposed between the lead layers and the end surface of the slider body to transfer heat applied to the conductive pads and the lead layers by the molten metal to the slider body.

In the magnetic head device according to the present disclosure, heat applied to the conductive pads when they are connected to the electrodes with the molten metal is transferred to the heat-conducting layers disposed below the lead layers and is further transferred to the slider body. This structure inhibits the shield layers and the magnetic sensor in contact therewith, such as a TMR sensor or a CPP GMR sensor, from being heated to high temperature, thus suppressing deterioration of the sensing function of the magnetic sensor due to heat. In addition, because the shield layers are not heated to high temperature, they undergo no variations in magnetic domain due to heat, thus preventing generation of superimposed noise in read output.

In the one embodiment of the present disclosure, the thermal conductivity of the heat-conducting layers is preferably equivalent to or higher than that of the lead layers. In addition, the area of the heat-conducting layers is preferably equal to or larger than that of the conductive pads.

In such cases, the heat-conducting layers can more readily release the heat applied to the conductive pads to the slider body.

In another embodiment of the present disclosure, preferably, the heat-conducting layers are formed of a metal, and an insulating layer is disposed between the heat-conducting layers and the end surface of the slider body to provide electrical insulation therebetween while allowing heat to pass through the insulating layer. The insulating layer has a thickness of 0.5 μm or less.

If such a thin insulating layer is disposed between the heat-conducting layers and the slider body, the insulating layer can insulate the heat-conducting layers from the slider body while allowing heat to be released from the heat-conducting layers to the slider body.

In another embodiment, preferably, the magnetic sensor is a tunneling magnetoresistive sensor, and the nonmagnetic layer is an electrically insulating layer. Alternatively, preferably, the magnetic sensor is a giant magnetoresistive sensor, and the nonmagnetic layer is a nonmagnetic conductive layer.

In the magnetic head device according to the present disclosure, heat applied from the molten metal to the conductive pads disposed on the end surface of the slider is transferred to the heat-conducting layers disposed below the conductive pads and is released to the slider. This structure can inhibit the shield layers from being heated to high temperature, thus stabilizing the magnetic domains of the shield layers and preventing a deterioration due to heat in the performance of the magnetic sensor in contact with the shield layers.

DESCRIPTION OF THE PREFERRED EMBODIMENTS

Figure 1:
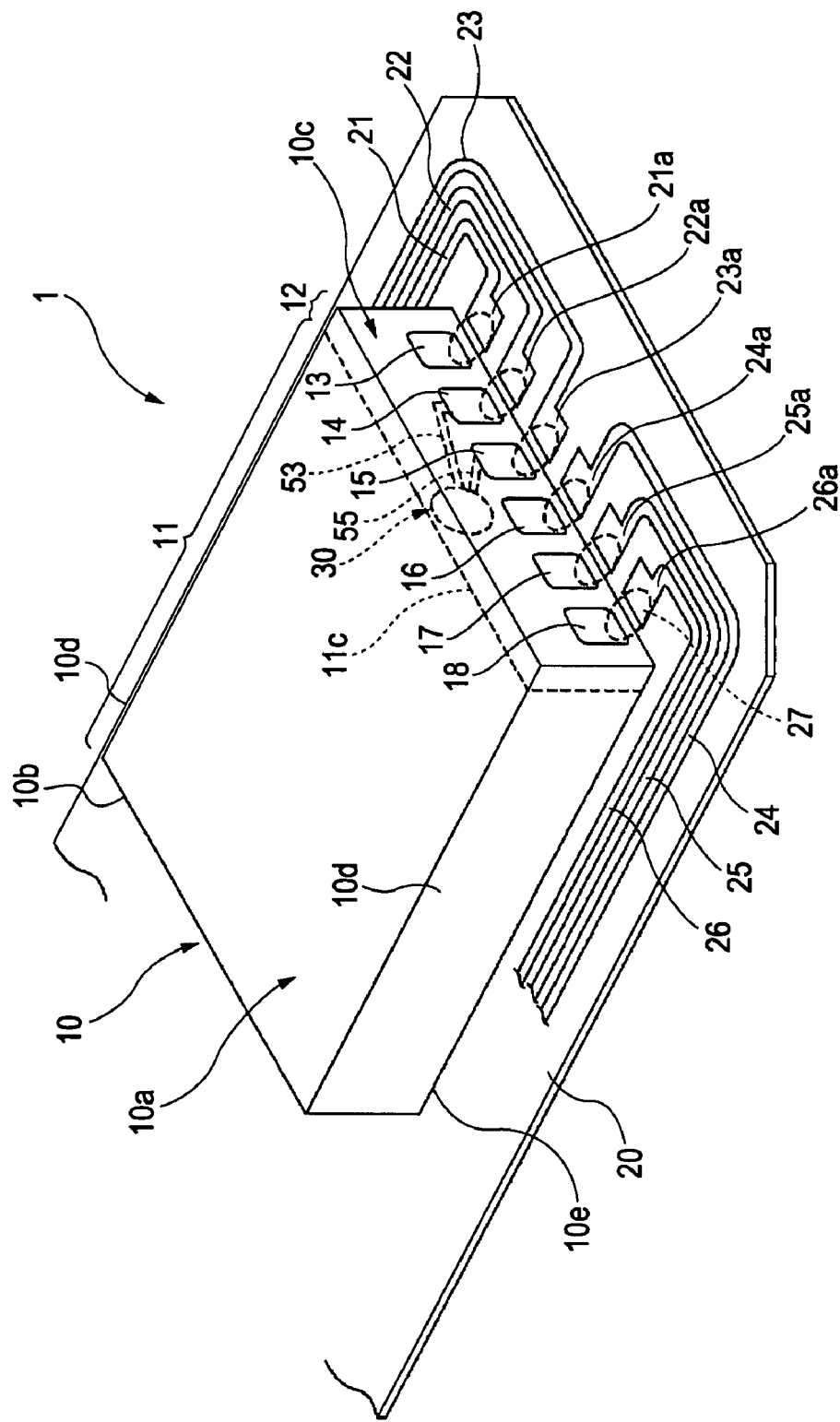
FIG. 1 is a partial perspective view of a magnetic head device according to an embodiment with a surface of a slider opposite a magnetic recording medium facing upward.
Figure 2:
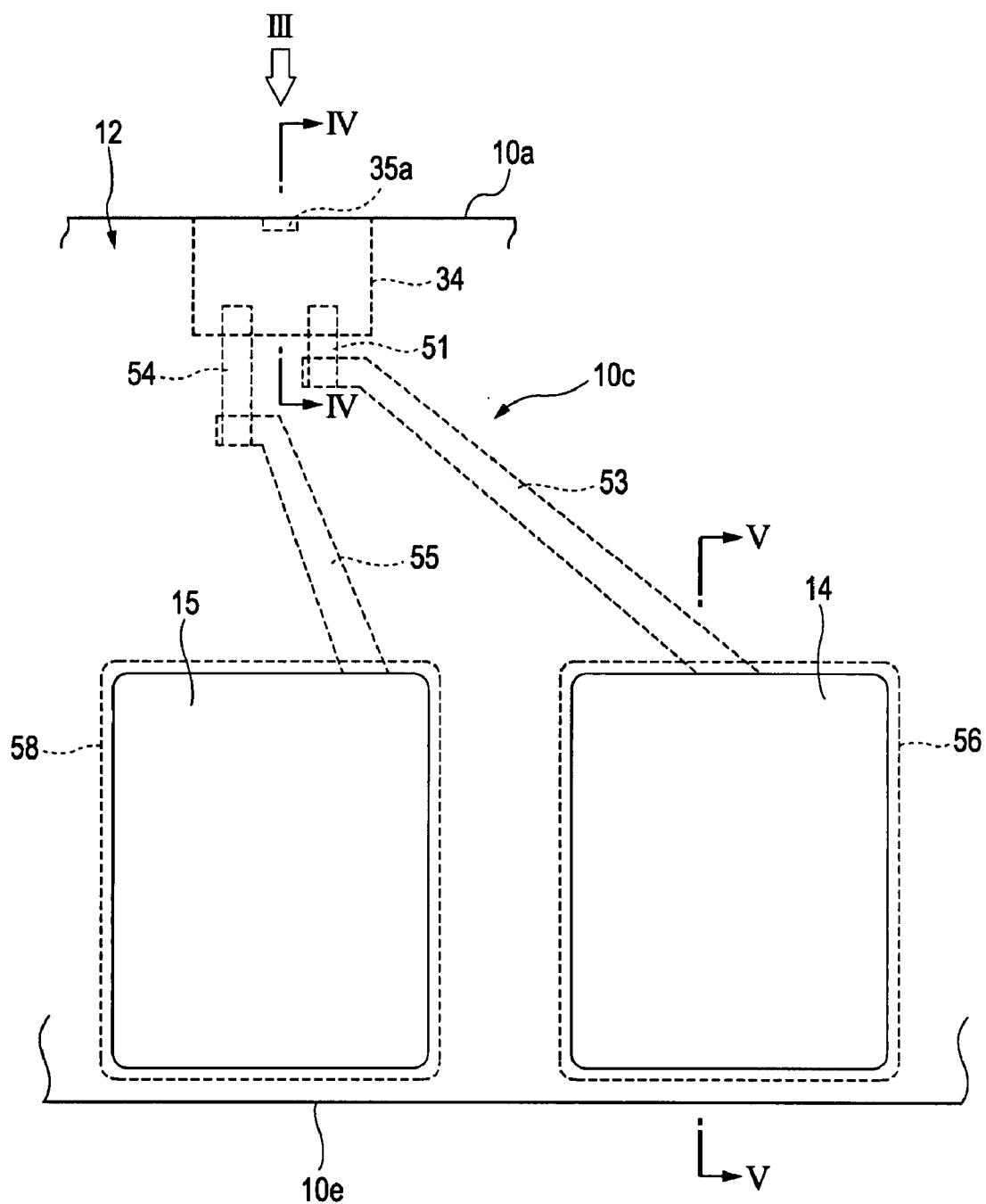
FIG. 2 is a partial enlarged front view of a trailing end surface of the slider shown in FIG. 1.
Figure 3:
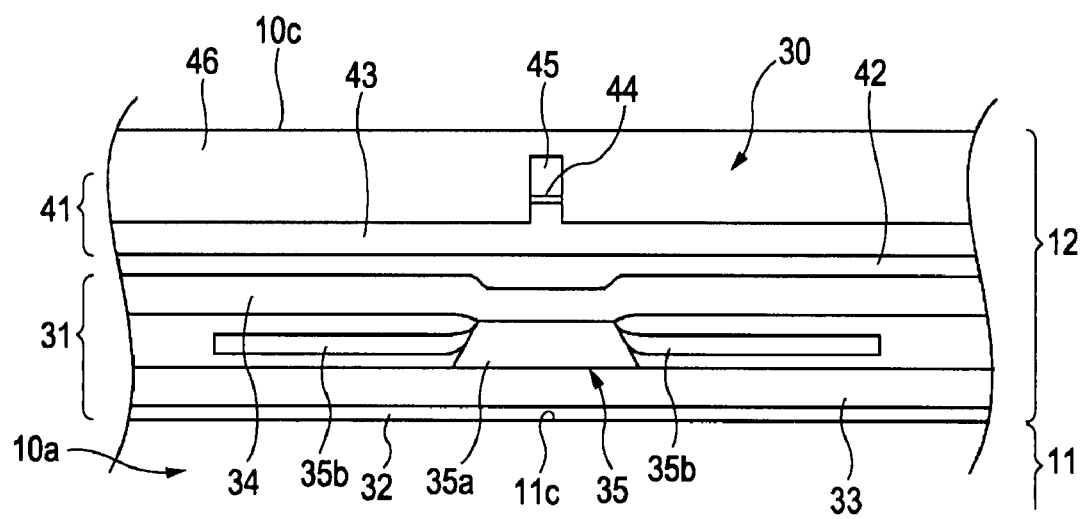
FIG. 3 is a partial enlarged plan view of the slider as viewed from the side opposite a magnetic recording medium in a direction indicated by arrow III of FIG. 2.
Figure 4:
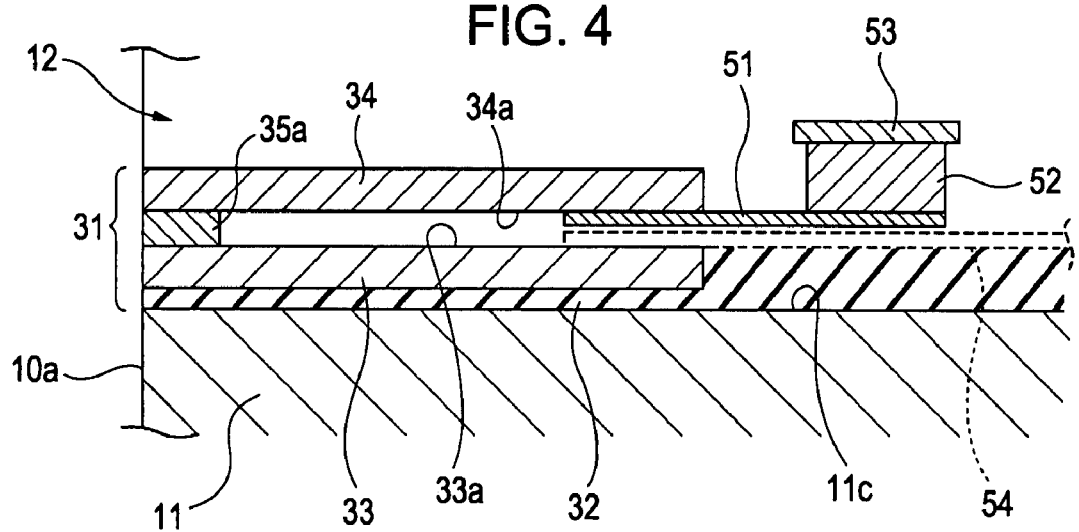
FIG. 4 is an enlarged sectional view taken along line IV-IV of FIG. 2.
Figure 5:
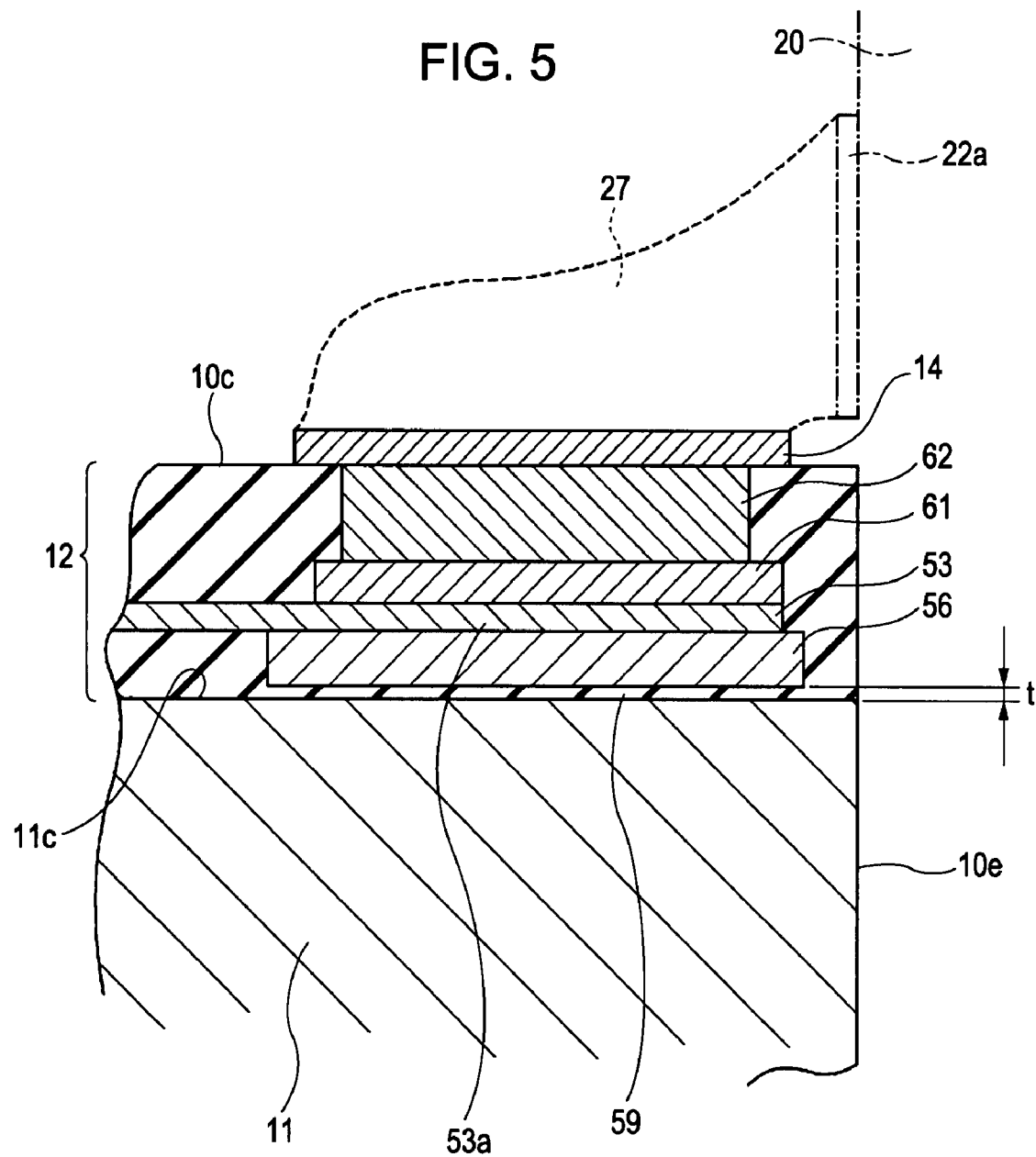
FIG. 5 is an enlarged sectional view taken along line V-V of FIG. 2.

FIG. 1 is a perspective view of a slider of a magnetic head device on a flexure with the side of the slider opposite a magnetic recording medium, such as a hard disk, facing upward. FIG. 2 is an enlarged view of an end surface of the slider. FIG. 3 is a partial enlarged view of a magnetic sensor as viewed from the side opposite a magnetic recording medium in a direction indicated by arrow III of FIG. 2. FIG. 4 is a partial sectional view taken along line IV-IV of FIG. 2. FIG. 5 is a partial sectional view taken along line V-V of FIG. 2.

Referring to FIG. 1, a magnetic head device 1 includes a slider 10 supported by a flexure 20. A support supporting the slider 10 includes the flexure 20 and a load beam supporting the flexure 20. The flexure 20 is attached to an end of the load beam. A base of the load beam is rotatably supported. The load beam is rotated by an actuator, so that the slider 10 supported by the flexure 20 can be moved between the inner and outer peripheries of a magnetic recording medium such as a hard disk.

The slider 10 includes a slider body 11 and an insulating part 12 disposed on an end surface of the slider body 11. The slider body 11, which itself is conductive, is formed of a ceramic material such as alumina-titanium carbide. An attachment surface 10e of the slider 10 is bonded to the flexure 20, and the surface opposite the attachment surface 10e is a disk-facing surface 10a facing a hard disk. The disk-facing surface 10a is an air-bearing surface (ABS) with a predetermined pattern of protrusions and recesses (not shown in FIG. 1). Air flows between the disk-facing surface 10a and the hard disk to cause positive pressure at the protrusions and negative pressure at the recesses.

An end surface of the slider 10, opposite the side where the insulating part 12 is disposed, is a leading end surface 10b facing the side from which the air flows. A surface of the insulating part 12 is a trailing end surface 10c facing the side to which the air flows. The slider 10 also has left and right side surfaces 10d.

The slider 10 has a magnetic head function part 30 in the insulating part 12. That is, the magnetic head function part 30 is positioned midway between an end surface 11c of the slider body 11 and the trailing end surface 10c of the insulating part 12.

FIG. 3 is an enlarged plan view of a region of the disk-facing surface 10a where the magnetic head function part 30 is disposed. The magnetic head function part 30 includes a magnetic read section 31 and a magnetic write section 41 stacked thereon.

In FIG. 3, the magnetic read section 31 includes an inorganic insulating layer 32 disposed on the end surface 11c of the slider body 11, a lower shield layer 33 disposed on the inorganic insulating layer 32, and an upper shield layer 34 separated from the lower shield layer 33. The inorganic insulating layer 32 is formed of, for example, $Al_2O_3$ or $SiO_2$. The shield layers 33 and 34 are formed of a magnetic material with relatively high permeability, for example, a Ni—Fe alloy.

A magnetic sensor 35 is disposed between the lower shield layer 33 and the upper shield layer 34. The magnetic sensor 35 includes a sensor body 35a having a bottom surface in contact with the lower shield layer 33 and a top surface in contact with the upper shield layer 34. A sensing current flows from the upper shield layer 34 to the lower shield layer 33 through the sensor body 35a. That is, the magnetic sensor 35 is a TMR sensor or a CPP GMR sensor, in which a sensing current flows perpendicularly to surfaces of layers.

The sensor body 35a, which is a TMR sensor in this example, includes an antiferromagnetic layer in contact with the lower shield layer 33 and a pinned magnetic layer disposed on the antiferromagnetic layer. The antiferromagnetic layer is formed of, for example, an Ir—Mn alloy, and the pinned magnetic layer is formed of, for example, a Co—Fe alloy. The magnetization direction of the pinned magnetic layer is fixed in a direction perpendicular to the disk-facing surface 10a by exchange coupling at the interface between the antiferromagnetic layer and the pinned magnetic layer. The sensor body 35a also includes an insulating layer having a tunneling effect and a free magnetic layer disposed on the insulating layer. The insulating layer is formed of, for example, TiO, and the free magnetic layer is formed of, for example, a Ni—Fe alloy. The free magnetic layer, or a thin protective layer disposed thereon, is in contact with the upper shield layer 34. The protective layer is formed of, for example, tantalum.

In FIG. 3, the sensor body 35a is a multilayer portion including the layers from the antiferromagnetic layer to the protective layer. Longitudinal bias layers 35b are disposed on the left and right sides of the sensor body 35a. These longitudinal bias layers 35b function as magnets to generate a longitudinal magnetic field acting on the free magnetic layer in the left or right direction. As a result, the free magnetic layer is forced into a single-domain state in the left or right direction.

When a magnetic field is applied perpendicularly from the hard disk to the magnetic sensor 35 to the disk-facing surface 10a with the current flowing perpendicularly from the upper shield layer 34 to the lower shield layer 33 through the magnetic sensor 35, the magnetic field changes the magnetization direction of the free magnetic layer, thus changing the electrical resistance of the sensor body 35a. By sensing the resistance change, the magnetic head device 1 can detect the leakage field from the hard disk.

If the magnetic sensor 35 is a CPP GMR sensor, the insulating layer of the TMR sensor is replaced with a nonmagnetic conductive layer such as a copper layer. The rest of the structure is the same as that of the TMR sensor.

The magnetic write section 41 includes an inorganic insulating layer 42 disposed on the upper shield layer 34, a lower core layer 43 disposed on the inorganic insulating layer 42, and an upper core layer 45 disposed on the lower core layer 43 with a nonmagnetic layer, namely, a gap layer 44, disposed therebetween. The lower core layer 43 is formed of a magnetic material such as a Ni—Fe alloy. The upper core layer 45 has a pole portion. A coil layer is disposed around the upper core layer 45 in the insulating part 12. The coil layer is supplied with current to generate a magnetic flux leaking from between the lower core layer 43 and the upper core layer 45, thus recording magnetic signals on the hard disk. A surface of the upper core layer 45 is covered with a protective layer 46 formed of a nonmagnetic material.

In FIG. 1, conductive pads 13 to 18 are arranged on the trailing end surface 10c of the slider 10. Of these, the conductive pads 14 and 15 are used to supply a sensing current to the sensor body 35a of the magnetic sensor 35 included in the magnetic read section 31. The other conductive pads are used to, for example, supply a recording current to the coil layer of the magnetic write section 41 or to supply current to a heater provided for the magnetic head function part 30.

Referring to FIGS. 2 and 4, a lead electrode 51 is connected to a rear end of a bottom surface 34a of the upper shield layer 34, which is connected to the top surface of the sensor body 35a of the magnetic sensor 35, so as to extend backward. In the insulating part 12, a lifting layer 52 is disposed on the lead electrode 51, and a first lead layer 53 is connected to the lifting layer 52. The lifting layer 52 is formed of a conductive material. Another lead electrode 54 is connected to a rear end of a top surface 33a of the lower shield layer 33, which is connected to the bottom surface of the sensor body 35a, so as to extend backward. Another lifting layer is connected to the lead electrode 54, and a second lead layer 55 is connected to the lifting layer. The lead electrodes 51 and 54 and the lead layers 53 and 55 are formed of a metal material with low resistance, for example, copper.

Referring to FIG. 5, an end 53a of the first lead layer 53 extends to below the conductive pad 14. The end 53a of the first lead layer 53 has the same shape and area as the conductive pad 14. The end 53a has a rectangular shape. Two lifting layers 61 and 62 are stacked on a surface of the end 53a of the first lead layer 53, and the conductive pad 14 is disposed on a surface of the upper lifting layer 62. For example, the lower lifting layer 61 is formed using a Ni—Fe alloy together with the upper shield layer 34. The upper lifting layer 62 is formed by, for example, copper plating. Also, the conductive pad 14 is formed by copper plating, and its surface is further plated with, for example, gold.

In FIG. 5, a heat-conducting layer 56 is provided below the end 53a of the first lead layer 53. The heat-conducting layer 56 is formed of a metal material with high thermal conductivity. Preferably, the heat-conducting layer 56 is formed of a metal material with thermal conductivity equivalent to or higher than that of the conductive pad 14. In addition, the heat-conducting layer 56 is formed of a metal material with thermal conductivity equivalent to or higher than that of the first lead layer 53. For example, the heat-conducting layer 56 is formed of copper, a copper alloy, aluminum, or an aluminum alloy.

If the thermal conductivity of the heat-conducting layer 56 is equivalent to or higher than those of the conductive pad 14 and the first lead layer 53, the heat-conducting layer 56 absorbs heat applied from the conductive pad 14 to the first lead layer 53 and transfers the heat to the slider body 11.

The area of the heat-conducting layer 56 is preferably equal to or larger than that of the conductive pad 14. In addition, the area of the heat-conducting layer 56 is preferably equal to or larger than that of the rectangular end 53a of the first lead layer 53.

In FIG. 5, an insulating layer 59 is disposed between the heat-conducting layer 56 and the slider body 11, which are both conductive. The insulating layer 59 is formed of an inorganic oxide such as $Al_2O_3$ or $SiO_2$ and has a thickness t of 0.5 to 0.05 µm. If the thickness t of the insulating layer 59 falls within the above range, the insulating layer 59 can provide electrical insulation between the heat-conducting layer 56 and the slider body 11 while maintaining low heat transfer resistance between the heat-conducting layer 56 and the slider body 11.

Similarly, an end of the second lead layer 55 extends to below the conductive pad 15, and another heat-conducting layer 58 is disposed between the end of the second lead layer 55 and the slider body 11. The heat-conducting layer 58 is formed of the same material as the heat-conducting layer 56 disposed below the end 53a of the first lead layer 53, and the numerical ranges preferred for the heat-conducting layer 58, including shape, are the same as those preferred for the heat-conducting layer 56.

While the heat-conducting layers 56 and 58 are provided for the conductive pads 14 and 15, respectively, electrically connected to the magnetic sensor 35, no heat-conducting layer is provided between the other conductive pads 13, 16, 17, and 18 and the slider body 11.

In FIG. 1, conductive patterns 21 to 26 are arranged on the surface of the flexure 20 with an insulating layer disposed therebetween. These conductive patterns 21 to 26 extend from the surface of the flexure 20 to the surface of the load beam. Electrodes 21a to 26a, wider than the conductive patterns 21 to 26, are formed integrally with the conductive patterns 21 to 26, respectively. With the slider 10 fixed to the flexure 20 by bonding, the electrode 21a is positioned near the conductive pad 13. Similarly, the electrodes 22a to 26a are positioned near the conductive pads 14 to 18, respectively.

The electrode 21a is connected to the conductive pad 13 with a solder 27, namely, a molten tin-silver alloy. Similarly, the other electrodes 22a to 26a are connected to the conductive pads 14 to 18, respectively, with the solder 27.

In FIG. 3, the magnetic sensor 35 of the magnetic read section 31 is a TMR sensor or a CPP GMR sensor, and the bottom and top surfaces of the sensor body 35a are in contact with the lower shield layer 33 and the upper shield layer 34, respectively. The first lead layer 53, connected to the upper shield layer 34, extends to below the conductive pad 14, and the second lead layer 55, connected to the lower shield layer 33, extends to below the conductive pad 15. If heat is transferred from the conductive pads 14 and 15 to the lead layers 53 and 55, respectively, the lower shield layer 33 and the upper shield layer 34 are heated to a high temperature. The heat is then readily transferred to the sensor body 35a. As a result, the sensor body 35a is readily heated to a high temperature. For example, if the sensor body 35a is heated to 230° C. or more, or 300° C. or more, the magnetization of the pinned magnetic layer of the sensor body 35a becomes unstable, thus causing problems with read accuracy, including increased noise in magnetic reading. In addition, the magnetic domains of the lower shield layer 33 and the upper shield layer 34 are varied when heated to high temperature. Such variations can cause superimposed noise in read output.

In the magnetic head device 1 according to this embodiment, as shown in FIGS. 1 to 5, heat is applied from the molten solder 27 to the conductive pads 14 and 15, which are arranged on the trailing end surface 10c of the slider 10, when the molten solder 27 is provided to bond the conductive pads 14 and 15 to the electrodes 21a and 22a, respectively. The heat is transferred through the lifting layers disposed below the conductive pads 14 and 15 to the ends of the lead layers 53 and 55. The ends of the lead layers 53 and 55 are wider than the rest of the lead layers 53 and 55. The areas of the underlying heat-conducting layers 56 and 58 are equal to or larger than those of the ends of the lead layers 53 and 55, respectively. Also, the thermal conductivity of the heat-conducting layers 56 and 58 is equivalent to or higher than that of the lead layers 53 and 55. Accordingly, the heat is released through the heat-conducting layers 56 and 58 to the slider body 11. The heat-conducting layers 56 and 58 can thus prevent the lower shield layer 33 and the upper shield layer 34 from being heated to high temperature and thus can readily prevent the sensor body 35a from being excessively heated.

In this embodiment, as shown in FIG. 5, the insulating layer 59 is formed between the heat-conducting layer 56 and the slider body 11 to such a thickness t that it ensures electrical insulation without obstructing heat transfer. The insulating layer 59 may also be formed between the heat-conducting layer 56 and the end 53a of the first lead layer 53 to such a thickness that it ensures electrical insulation without obstructing heat transfer.

What is claimed is:

1. A magnetic head device comprising:
    a slider body facing a magnetic recording medium;
    an insulating part disposed on an end surface of the slider body;
    a magnetic sensor disposed in the insulating part so as to face the magnetic recording medium;
    conductive pads disposed on a surface of the insulating part, the conductive pads being bonded with a molten metal to electrodes of a support supporting the slider body; and
    lead layers disposed in the insulating part to electrically connect the magnetic sensor to the conductive pads;
    wherein the magnetic sensor includes a pinned magnetic layer whose magnetization direction is fixed, a free magnetic layer whose magnetization direction is changed by an external magnetic field, and a nonmagnetic layer disposed therebetween;
    wherein the lead layers are electrically connected to a pair of shield layers between which the magnetic sensor is disposed so that a sensing current can be supplied to the magnetic sensor via the shield layers; and
    wherein the conductive pads are electrically connected to the lead layers in the insulating part by stacking the conductive pads on the lead layers, and heat-conducting layers are disposed between the lead layers and the end surface of the slider body to transfer heat applied to the conductive pads and the lead layers by the molten metal to the slider body.

2. The magnetic head device according to claim 1, wherein the thermal conductivity of the heat-conducting layers is equivalent to or higher than that of the lead layers.

3. The magnetic head device according to claim 1, wherein the area of the heat-conducting layers is equal to or larger than that of the conductive pads.

4. The magnetic head device according to claim 1, wherein the heat-conducting layers comprise a metal, and an insulating layer is disposed between the heat-conducting layers and the end surface of the slider body.

5. The magnetic head device according to claim 1, wherein the magnetic sensor is a tunneling magnetoresistive sensor, and the nonmagnetic layer is an electrically insulating layer.

6. The magnetic head device according to claim 1, wherein the magnetic sensor is a giant magnetoresistive sensor, and the nonmagnetic layer is a nonmagnetic conductive layer.

7. The magnetic head device according to claim 1, wherein the conductive pads are electrically connected to the lead layers in the insulating part by stacking the conductive pads on the lead layers directly.

8. The magnetic head device according to claim 1, wherein another conductive layer is disposed between the conductive pads and the lead layers in the insulating part.

* * * * *